(12) United States Patent
Huang et al.

(10) Patent No.: US 11,809,990 B2
(45) Date of Patent: Nov. 7, 2023

(54) METHOD APPARATUS AND SYSTEM FOR GENERATING A NEURAL NETWORK AND STORAGE MEDIUM STORING INSTRUCTIONS

(71) Applicant: CANON KABUSHIKI KAISHA, Tokyo (JP)

(72) Inventors: Yaohai Huang, Beijing (CN); Xingyi Huang, Beijing (CN); Yan Li, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 17/010,646

(22) Filed: Sep. 2, 2020

(65) Prior Publication Data

US 2021/0073590 A1    Mar. 11, 2021

(30) Foreign Application Priority Data

Sep. 6, 2019    (CN) .......................... 201910841072.1

(51) Int. Cl.
*G06N 3/08* (2023.01)
*G06N 3/02* (2006.01)
(Continued)

(52) U.S. Cl.
CPC ............. *G06N 3/08* (2013.01); *G06F 18/217* (2023.01); *G06F 18/22* (2023.01); *G06N 3/02* (2013.01); *G06V 10/454* (2022.01); *G06V 10/764* (2022.01); *G06V 40/10* (2022.01); *G06V 40/16* (2022.01); *G06V 40/168* (2022.01); *G06V 40/172* (2022.01); *G06V 40/178* (2022.01)

(58) Field of Classification Search
CPC .. G06K 9/6262; G06K 9/6215; G06V 40/168; G06V 40/172; G06V 40/10; G06V 40/178; G06N 3/02
USPC ........................................................ 382/118
See application file for complete search history.

(56) References Cited

U.S. PATENT DOCUMENTS

2015/0051840 A1 * 2/2015 Vervier ................. G16B 40/00
702/19

OTHER PUBLICATIONS

Levi, "Age and Gender Classification using Convolutional Neural Networks", CVPR 2015 (Year: 2015).*
(Continued)

*Primary Examiner* — Mark Roz
(74) *Attorney, Agent, or Firm* — Canon U.S.A., Inc. IP Division

(57) ABSTRACT

The present disclosure includes a method, apparatus and system for generating a neural network and a non-transitory computer readable storage medium storing instructions. The method comprises: recognizing at least an attribute of an object in a sample image according to a feature extracted from the sample image, using the neural network; determining a loss function value at least according to a margin value determined based on a semantic relationship between attributes, wherein the semantic relationship is obtained from a predefined table at least according to a real attribute and the recognized attribute of the object, wherein the predefined table is composed of the attributes and the semantic relationship between the attributes; updating a parameter in the neural network according to the determined loss function value. When using the neural network generated according to the present disclosure, the accuracy of object attribute recognition can be improved.

14 Claims, 11 Drawing Sheets

(51) Int. Cl.
    *G06V 40/10*     (2022.01)
    *G06V 40/16*     (2022.01)
    *G06F 18/21*     (2023.01)
    *G06F 18/22*     (2023.01)
    *G06V 10/764*     (2022.01)
    *G06V 10/44*     (2022.01)

(56) References Cited

OTHER PUBLICATIONS

Krawczyk, Hyperspectral Image Analysis Based on Color Channels and Ensemble Classifier, HAIS 2014 (Year: 2014).*
Jiankang Deng, et al., ArcFace: Additive Angular Margin Loss for Deep Face Recognition, arXiv:1801.07698v1 [cs.CV] Jan. 23, 2018, 13 pages.

* cited by examiner

| REAL / PREDICTED | [0~9] | [10~19] | [20~29] | [30~39] | ... | [70~79] | ... |
|---|---|---|---|---|---|---|---|
| [0~9] | 0 | 10 | 20 | 30 | ... | 70 | ... |
| [10~19] | 10 | 0 | 10 | 20 | ... | 60 | ... |
| [20~29] | 20 | 10 | 0 | 10 | ... | 50 | ... |
| [30~39] | 30 | 20 | 10 | 0 | ... | 40 | ... |
| ... | ... | ... | ... | ... | ... | ... | ... |
| [70~79] | 70 | 60 | 50 | 40 | ... | 0 | ... |
| ... | ... | ... | ... | ... | ... | ... | ... |

FIG. 1A

| REAL / PREDICTED | [MALE + BEARDED] | [MALE + BEARDLESS] | [FEMALE + BEARDED] | [FEMALE + BEARDLESS] |
|---|---|---|---|---|
| [MALE + BEARDED] | 0 | 1 | 1 | 2 |
| [MALE + BEARDLESS] | 1 | 0 | 2 | 1 |
| [FEMALE + BEARDED] | 1 | 2 | 0 | 1 |
| [FEMALE + BEARDLESS] | 2 | 1 | 1 | 0 |

FIG. 1B

| REAL \ REAL | [0~9] | [10~19] | [20~29] | [30~39] | ... | [70~79] | ... |
|---|---|---|---|---|---|---|---|
| [0~9] | 0 | 10 | 20 | 30 | ... | 70 | ... |
| [10~19] | 10 | 0 | 10 | 20 | ... | 60 | ... |
| [20~29] | 20 | 10 | 0 | 10 | ... | 50 | ... |
| [30~39] | 30 | 20 | 10 | 0 | ... | 40 | ... |
| ... | ... | ... | ... | ... | ... | ... | ... |
| [70~79] | 70 | 60 | 50 | 40 | ... | 0 | ... |
| ... | ... | ... | ... | ... | ... | ... | ... |

FIG. 11

| PREDICTED \ REAL | [MALE + BEARDED] | [MALE + BEARDLESS] | [FEMALE + BEARDED] | [FEMALE + BEARDLESS] |
|---|---|---|---|---|
| [MALE + BEARDED] | 0 | 3.95 | 6.35 | 3.65 |
| [MALE + BEARDLESS] | 3.95 | 0 | 8.15 | 1.85 |
| [FEMALE + BEARDED] | 6.35 | 8.15 | 0 | 9.05 |
| [FEMALE + BEARDLESS] | 3.65 | 1.85 | 9.05 | 0 |

FIG. 13A

|  | MALE | FEMALE |
|---|---|---|
| BEARDLESS | 0.7 | 0.9 |
| BEARDED | 0.3 | −0.9 |

FIG. 13B

METHOD APPARATUS AND SYSTEM FOR GENERATING A NEURAL NETWORK AND STORAGE MEDIUM STORING INSTRUCTIONS

BACKGROUND

Field of the Disclosure

The present disclosure relates to image processing, and in particular to a method, an apparatus and a system for generating a neural network, and a storage medium storing instructions, for example.

Description of the Related Art

In the field of machine vision academic research and product application, face attribute recognition is an important task. Face attributes include, for example, age, gender, ethnicity, hair color, and the like. These attributes are critical in tasks such as crowd analysis, attribute statistics, and identity verification. As the most representative attribute feature of face attributes, age is usually widely used in systems such as crowd analysis, attribute statistics, and identity verification. However, in an actual surveillance video, due to the interference of factors such as lighting or shielding, the attribute recognition results of the same face often fluctuate greatly. Especially when the age recognition fluctuates greatly, the functions of systems such as crowd analysis, attribute statistics, and identity verification will also be greatly affected, thereby greatly reducing the user's experience for these systems.

With the development of neural networks, neural networks are widely used for face recognition and face attribute recognition. In the face recognition (especially for classification tasks of the face recognition), in view of the robustness of the Softmax loss function, it is often used to calculate a loss function value in a neural network. Further, in order to expand the feature distance between different categories in the classification task to improve the accuracy of face recognition, a loss function related to a margin may be introduced into the neural network. For example, the non-patent document "ArcFace: Additive Angular Margin Loss for Deep Face Recognition" (Jiankang Deng, Jia Guo, Niannan Xue, Stefanos Zafeiriou; arXiv:1801.07698v1 [cs.CV] 23 Jan. 2018) discloses an exemplary technology of introducing a loss function related to a fixed margin into the neural network to expand the feature angle between different face categories, thereby improving the accuracy of face recognition. Wherein in the process of generating the neural network, at the time of calculating the loss function value, the exemplary technology adds a constant (i.e., a fixed margin value) to the feature angle within the same face category that is labeled, to reduce the cosine angle difference (i.e., feature distance) of features within the same face category, thereby expanding the feature angle between samples of different face categories; after that, the corresponding loss function value can be calculated according to a predicted face category and the labeled real face category to which the fixed margin value has been added.

As can be seen from the above, the above-mentioned exemplary technology is mainly used for face recognition. In the face recognition, since the number of face categories is relatively large, it is difficult to measure the feature distance between different face categories using a numerical value, and meanwhile, and make the feature distance within the same face category relatively small. Therefore, the above exemplary technology can be used to expand the feature distance between different face categories to ensure the robustness of face recognition. However, in the face attribute recognition, since the number of face attribute categories to be recognized is relatively small, the feature distance between different face attribute categories is greatly different. For example, in the recognition of a person's age interval, the feature distance (for example, apparent feature distance) between the [20-29] age interval and the [70-79] age interval is much larger than that between the [20-29] age interval and the [30-39] age interval. Therefore, if the same fixed margin value is used to expand the feature angle between different face attribute categories, as in the above exemplary technology, such difference in the feature distance between different face attribute categories cannot be measured, so that there are many sample images with large errors between the labeled real face attributes and the predicted face attributes among sample images used to generate the neural network, which affects the recognition accuracy of face attributes and further affects the actual use value of face attribute recognition.

SUMMARY

In view of the above recordation in the Description of the Related Art, the present disclosure aims to solve at least one of the above problems.

According to an aspect of the present disclosure, there is provided a method for generating a neural network for recognizing an attribute of an object, comprising: recognizing at least an attribute of an object in a sample image according to a feature extracted from the sample image, using the neural network; determining a loss function value at least according to a margin value determined based on a semantic relationship between attributes, wherein the semantic relationship is obtained from a predefined table at least according to a real attribute and the recognized attribute of the object, wherein the predefined table is composed of the attributes and the semantic relationship between the attributes; and updating a parameter in the neural network according to the determined loss function value.

According to another aspect of the present disclosure, there is provided an apparatus for generating a neural network for recognizing an attribute of an object, comprising: a recognizing unit configured to recognize at least an attribute of an object in a sample image according to a feature extracted from the sample image, using the neural network; a determining unit configured to determine a loss function value at least according to a margin value determined based on a semantic relationship between attributes, wherein the semantic relationship is obtained from a predefined table at least according to a real attribute and the recognized attribute of the object, wherein the predefined table is composed of the attributes and the semantic relationship between the attributes; and an updating unit configured to update a parameter in the neural network according to the determined loss function value.

Wherein in the present disclosure, the attribute of the object may represent the semantic characteristic of the object. For example, in a case where the object is a human face, its attributes are, for example, age interval, ethnicity, gender, hair color, and the like. Wherein in the present disclosure, the recognized attributes of the object are, for example, a person's age interval, more than one face attribute (e.g., age interval, gender, ethnicity, hair color, and the like) of a person or more than one human body attribute (e.g., gender, whether glasses are worn, shirt color, pants color, and the like) of a person.

According to still another aspect of the present disclosure, there is provided a system for generating a neural network for recognizing an attribute of an object, comprising: one or more memories having stored thereon data and instructions; and one or more processors connected to the one or more memories and used to execute the instructions, the instructions comprising: recognizing at least an attribute of an object in a sample image according to a feature extracted from the sample image, using the neural network; determining a loss function value at least according to a margin value determined based on a semantic relationship between attributes, wherein the semantic relationship is obtained from a predefined table at least according to a real attribute and the recognized attribute of the object, wherein the predefined table is composed of the attributes and the semantic relationship between the attributes; and updating a parameter in the neural network according to the determined loss function value.

According to yet another aspect of the present disclosure, there is provided a non-transitory computer readable storage medium storing instructions, which, when executed by one or more processors, enable to execute a method of generating a neural network for recognizing an attribute of an object, the instructions comprising: recognizing at least an attribute of an object in a sample image according to a feature extracted from the sample image, using the neural network; determining a loss function value at least according to a margin value determined based on a semantic relationship between attributes, wherein the semantic relationship is obtained from a predefined table at least according to a real attribute and the recognized attribute of the object, wherein the predefined table is composed of the attributes and the semantic relationship between the attributes; and updating a parameter in the neural network according to the determined loss function value.

As described above, the margin value used in the present disclosure is determined based on the semantic relationship between the attributes of the object to be recognized, so that the margin value used in the present disclosure is a dynamically changed margin value rather than a fixed margin value. Since the semantic relationship is obtained from a predefined table composed of the attributes and the semantic relationship between the attributes, the margin value determined based on the semantic relationship can reflect different semantic distances between different attribute categories, so that in the process of generating neural networks, the feature distance between different attribute categories is different. Therefore, according to the present disclosure, among different attribute categories, the larger the semantic distance is, the larger the feature distance is, thereby reducing the number of sample images with a large error between the labeled real attribute and the predicted attribute, which can further improve the accuracy of object attribute recognition.

Further features and advantages of the present disclosure will become apparent from the following description of typical embodiments with reference to the accompanying drawings.

BRIEF DESCRIPTION OF THE DRAWINGS

The accompanying drawings, which are incorporated in and constitute a part of the specification, illustrate embodiments of the present disclosure, and together with the description of the embodiments, serve to explain the principles of the present disclosure.

FIGS. 1A to 1B are diagrams schematically illustrating examples of tables predefined in accordance with one or more aspects of the present disclosure.

FIG. 11 schematically illustrates another example of a table predefined according to one or more aspects of the present disclosure.

FIG. 13A schematically illustrates still another example of a table predefined according to one or more aspects of the present disclosure, and FIG. 13B schematically illustrates an example of a correlation matrix according to one or more aspects of the present disclosure.

DESCRIPTION OF THE EMBODIMENTS

Figure 2:
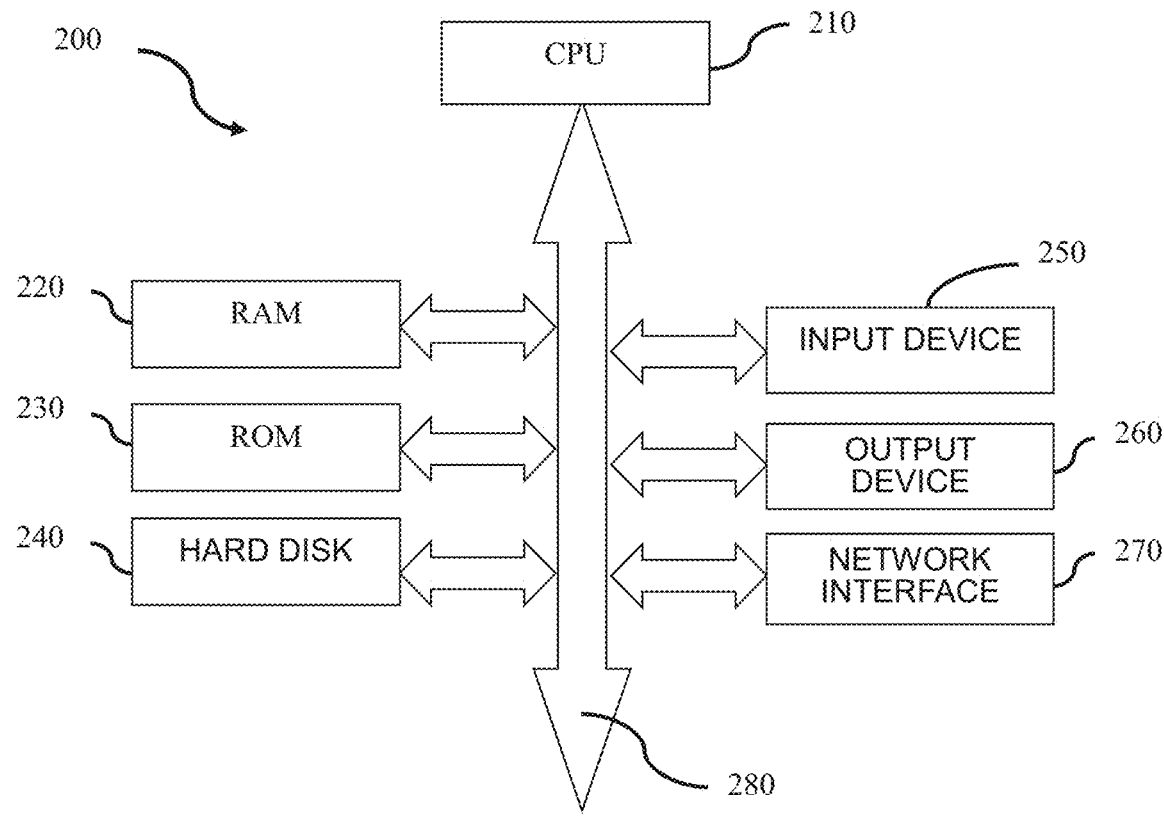
FIG. 2 is a block diagram schematically illustrating a hardware configuration that can implement a technology according to one or more aspects of the present disclosure.

Hereinafter, exemplary embodiments of the present disclosure will be described in detail with reference to the accompanying drawings. It should be noted that the following description is merely illustrative and exemplary in nature and is in no way intended to limit the present disclosure and its applications or uses. Unless specifically stated otherwise, the relative arrangement of components and steps, numerical expressions, and numerical values set forth in the embodiments do not limit the scope of the present disclosure. In addition, technologies, methods, and devices known to those skilled in the art may not be discussed in detail, but they should be a part of this specification where appropriate.

Please note that similar reference numerals and letters refer to similar items in the drawings, so that once an item is defined in one drawing, it is unnecessary to discuss this item in the following drawings.

As mentioned above, in the process of generating a neural network for recognizing an attribute of an object, the dynamically changed margin value used in the present disclosure is determined based on the semantic relationship between the recognized attributes of the object, and the attributes of the object may often represent the semantic characteristics of the object. Therefore, the inventor considers that a table can be predefined according to the definition of the attribute category of the object to measure the semantic relationship between attributes, and then the semantic relationship between the predicted attribute and the labeled real attribute can be obtained from the predefined table by these two attributes, to determine the dynamically changed margin value that can be used to determine the loss function value. Wherein hereinafter, this dynamically changed margin value may be referred to as a semantic-based margin value, for example. Regarding the above predefined table, the inventor considers that rows of the table (for example, the X-axis direction) can be used to represent one attribute category, columns of the table (for example, the Y-axis direction) can be used to represent another attribute category, and the intermediate position of the table can be used to represent the semantic relationship between attributes, wherein these attributes can be, for example, labeled real attributes or predicted attributes. Regarding the semantic relationship between attributes, the inventor considers that the semantic relationship is mainly an order relationship between attributes or a similarity relationship between attributes.

For example, in a case where the recognized attribute of the object is a person's age interval, the semantic relationship between different age intervals is an order relationship between the age intervals. For example, the X-axis direction and the Y-axis direction in the above predefined table may be represented by different age intervals, wherein for example, the age interval includes [0-9] age interval, [10-19] age interval, [20-29] age interval, [30-39] age interval, and the like. Obviously, the division of a person's age interval is not limited to this, and the age interval can be divided into different range sizes according to an actual application situation. The intermediate position in the above predefined table may be represented by, for example, an order relationship between age intervals, wherein the order relationship between age intervals may be measured by a Euclidean distance, for example. For example, for the age intervals [20-29] and [30-39], the Euclidean distance between them is 10; for the age intervals [20-29] and [70-79], the Euclidean distance between them is 50. As an example, in a case where the X-axis direction of the above predefined table represents the labeled real age interval and the Y-axis direction represents the predicted age interval, the above predefined table is shown in FIG. 1A, for example. In addition, obviously, the order relationship between age intervals can also be measured by other manners, such as a Hamming distance or a correlation coefficient. In addition, the recognized attribute of the object is not limited to a person's age interval, as long as it is a face attribute having an order characteristic.

For example, in a case where the recognized attribute of the object is more than one face attribute of a person, the semantic relationship between different face attributes is a similarity relationship between the face attributes. For example, both the X-axis direction and Y-axis direction in the above-mentioned predefined table may be represented by a combination of face attributes, wherein each face attribute is, for example, age interval, gender, ethnicity, hair color, or the like. Obviously, each of the recognized face attributes can be determined according to an actual application situation. The intermediate position in the above predefined table may be represented by, for example, a similarity relationship between the combination of face attributes, wherein the similarity relationship between the combination of face attributes may be measured by, for example, a Hamming distance or a correlation coefficient, wherein the correlation coefficient can be obtained from a correlation matrix composed of face attributes. As an example, assuming that the recognized face attribute is [gender+be bearded or not], in a case where the X-axis direction of the above predefined table is used to represent the combination of labeled real face attributes and the Y-axis direction is used to represent the combination of predicted face attributes, and in a case where the Hamming distance is used to measure a similarity relationship between the combination of face attributes, the above-mentioned predefined table is shown in FIG. 1B, for example.

As mentioned above, the semantic-based margin value obtained according to the present disclosure is a dynamically changed margin value and can reflect different semantic distances between different attribute categories, so that in the process of generating a neural network, the feature distance between different attribute categories is different. Therefore, according to the present disclosure, among different attribute categories, the larger the semantic distance is, the larger the feature distance is, thereby reducing the number of sample images with a large error between the labeled real attribute and the predicted attribute, which can further improve the accuracy of object attribute recognition.

(Hardware Configuration)

First, a hardware configuration that can implement the technology described below will be described with reference to FIG. 2.

The hardware configuration 200 includes, for example, a central processing unit (CPU) 210, a random access memory (RAM) 220, a read-only memory (ROM) 230, a hard disk 240, an input device 250, an output device 260, a network interface 270, and a system bus 280. In one implementation, the hardware configuration 200 may be implemented by a computer, such as a tablet computer, a notebook computer, a desktop computer, or other suitable electronic devices.

In one implementation, the apparatus for generating a neural network according to the present disclosure is constructed by hardware or firmware and is used as a module or component of the hardware configuration 200. For example, an apparatus 300 for generating a neural network, which will be described in detail below with reference to FIG. 3, may be used as a module or component of the hardware configuration 200. In another implementation, the method for generating a neural network according to the present disclosure is constructed by software stored in the ROM 230 or the hard disk 240 and executed by the CPU 210. For example, a method 400 for generating a neural network, which will be described in detail below with reference to FIG. 4, methods 900-1000 for generating a neural network, which will be described in detail below with reference to FIGS. 9 to 10, a method 1200 for generating a neural network, which will be described in detail below with reference to FIG. 12 and a method 1400 for generating a neural network, which will be described in detail below with reference to FIG. 14 can be used as programs stored in the ROM 230 or the hard disk 240.

The CPU 210 is any suitable programmable control device (such as a processor) and can execute various functions to be described below by executing various applications stored in the ROM 230 or the hard disk 240 (such as a memory). The RAM 220 is used to temporarily store programs or data loaded from the ROM 230 or the hard disk 240, and is also used as a space where the CPU 210 executes various processes (such as implementing a technology to be described in detail below with reference to FIGS. 4 to 14) and other available functions. The hard disk 240 stores a variety of information such as an operating system (OS), various applications, control programs, sample images, generated neural networks, predefined tables, and the like.

In one implementation, the input device 250 is used to allow a user to interact with the hardware configuration 200. In one example, the user may input a sample image labeled with the real attributes of the object through the input device 250. In another example, the user may trigger the corresponding process of the present disclosure through the input device 250. Further, the input device 250 may take a variety of forms, such as a button, a keyboard, or a touch screen.

In one implementation, the output device 260 is used to store the finally generated neural network into, for example, the hard disk 240 or to output the finally generated neural network to subsequent image processing such as an object attribute recognition and the like.

The network interface 270 provides an interface for connecting the hardware configuration 200 to a network. For example, the hardware configuration 200 may perform, via the network interface 270, data communication with other electronic devices connected via a network. Optionally, a wireless interface may be provided to the hardware configuration 200 to perform wireless data communication. The system bus 280 may provide a data transmission path for transmitting data between the CPU 210, the RAM 220, the ROM 230, the hard disk 240, the input device 250, the output device 260, the network interface 270, and the like to each other. Although referred to as a bus, the system bus 280 is not limited to any particular data transmission technology.

The hardware configuration 200 described above is merely illustrative and is by no means intended to limit the present disclosure, its application or uses.

(Apparatus and Method for Generating a Neural Network)

Next, generation of a neural network according to the present disclosure will be described with reference to FIGS. 3 to 14.

Figure 3:
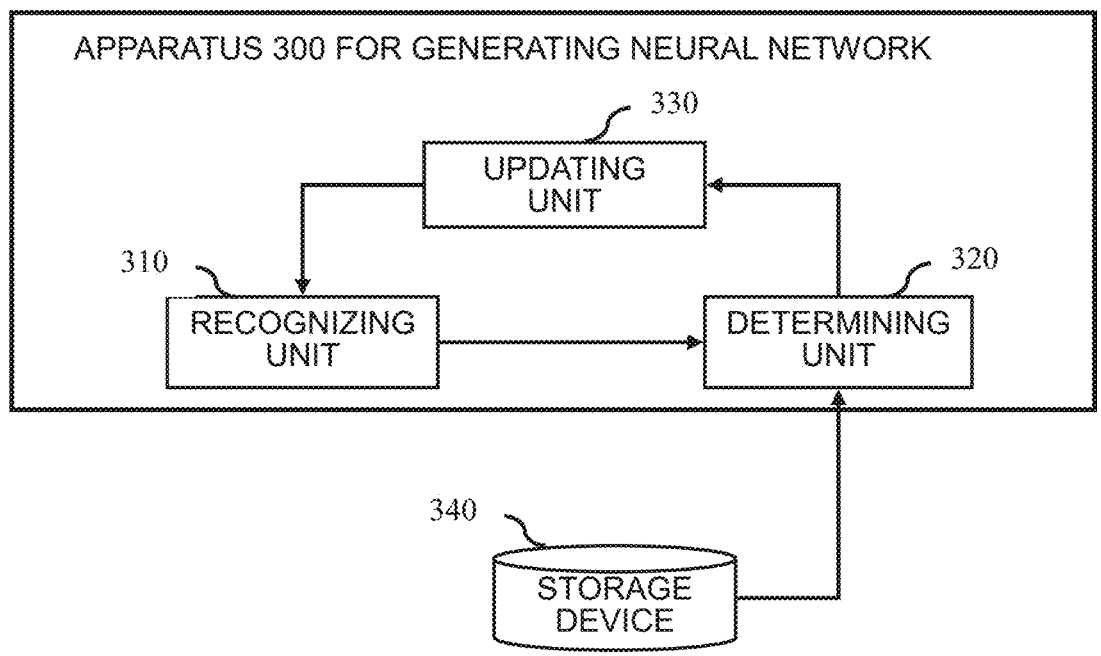
FIG. 3 is a block diagram schematically illustrating a configuration of an apparatus for generating a neural network according to one or more aspects of the present disclosure.

FIG. 3 is a block diagram schematically illustrating a configuration of an apparatus 300 for generating a neural network according to an embodiment of the present disclosure. Wherein some or all of the modules shown in FIG. 3 may be implemented by a dedicated hardware. As shown in FIG. 3, the apparatus 300 includes a recognizing unit 310, a determining unit 320, and an updating unit 330.

In addition, a storage device 340 shown in FIG. 3 stores, for example, at least the predefined table as described above. As described above, the predefined table is composed of attributes and the semantic relationship between the attributes. In one implementation, the storage device 340 is the ROM 230 or the hard disk 240 as shown in FIG. 2. In another implementation, the storage device 340 is a server or an external storage device connected to the apparatus 300 via a network (not shown).

First, for example, the input device 250 shown in FIG. 2 receives an initial neural network and sample images input by a user. Wherein the input initial neural network is used to recognize an attribute of an object, and wherein the recognized attribute of the object is, for example, a person's age interval, more than one face attribute (e.g., age interval, gender, ethnicity, hair color, and the like) of a person or more than one human body attribute (e.g., gender, whether glasses are worn, shirt color, pants color, and the like) of a person. Wherein the input sample images are labeled with a real attribute of the object, and wherein the input sample images may be a plurality of single sample images or a plurality of paired sample images. The input device 250 then transmits the received initial neural network and sample images to the apparatus 300 via the system bus 280.

Then, as shown in FIG. 3, the recognizing unit 310 uses the neural network to recognize at least the attribute of the object in the sample image (i.e., the predicted attribute of the object) based on the feature extracted from the sample image.

The determining unit 320 obtains a predefined table from the storage device 340, obtains, at least according to the real attribute of the object labeled in the sample image and the predicted attribute of the object obtained by the recognizing unit 310, a semantic relationship between the real attribute and the predicted attribute from the predefined table, determines a semantic-based margin value according to the obtained semantic relationship, and determines a loss function value at least according to the semantic-based margin value.

The updating unit 330 updates parameters in the neural network according to the loss function value determined by the determining unit 320.

Finally, the updating unit 330 transmits the finally generated neural network to the output device 260 via the system bus 280 shown in FIG. 2 for storing the finally generated neural network in, for example, the hard disk 240 or for outputting the generated neural network to subsequent image processing such as object attribute recognition.

Figure 4:
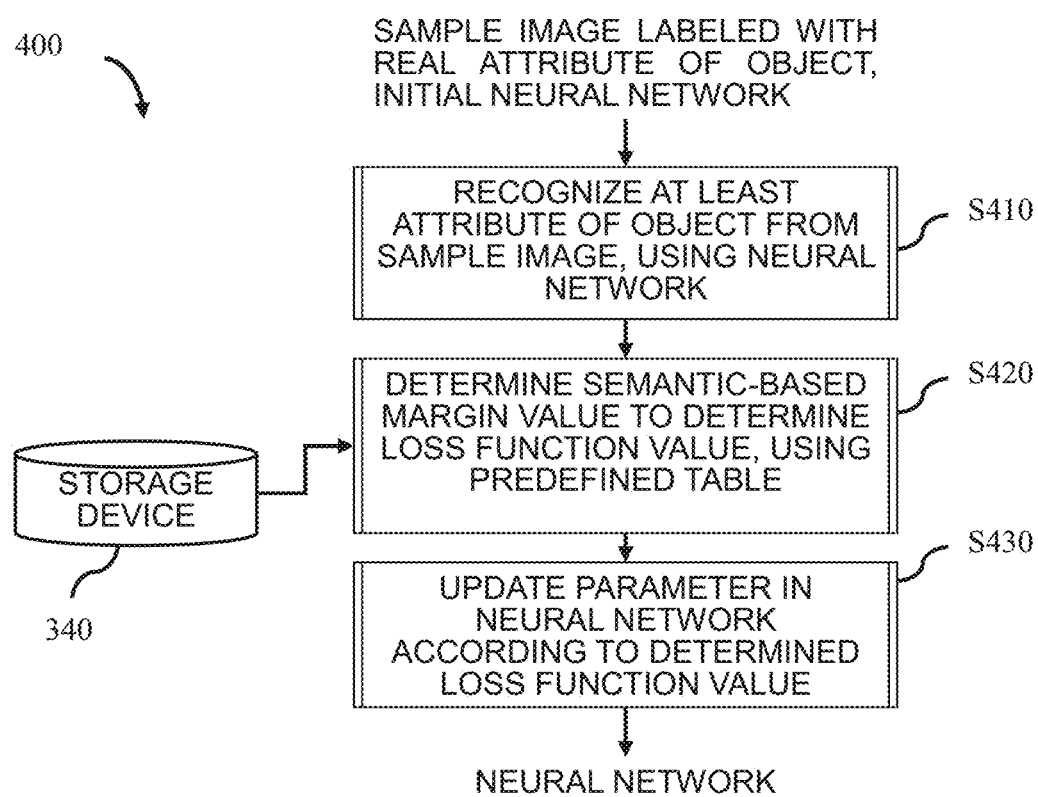
FIG. 4 is a flowchart schematically illustrating a method for generating a neural network according to one or more aspects of the present disclosure.

The method flowchart 400 shown in FIG. 4 is a corresponding process of the apparatus 300 shown in FIG. 3.

As shown in FIG. 4, in a recognizing step S410, the recognizing unit 310 uses a neural network to recognize at least the attribute of the object in the sample image (that is, the prediction attribute of the object) according to the features extracted from the sample image. In one implementation, the recognizing unit 310 performs a corresponding recognition operation with reference to FIG. 5.

Figure 5:
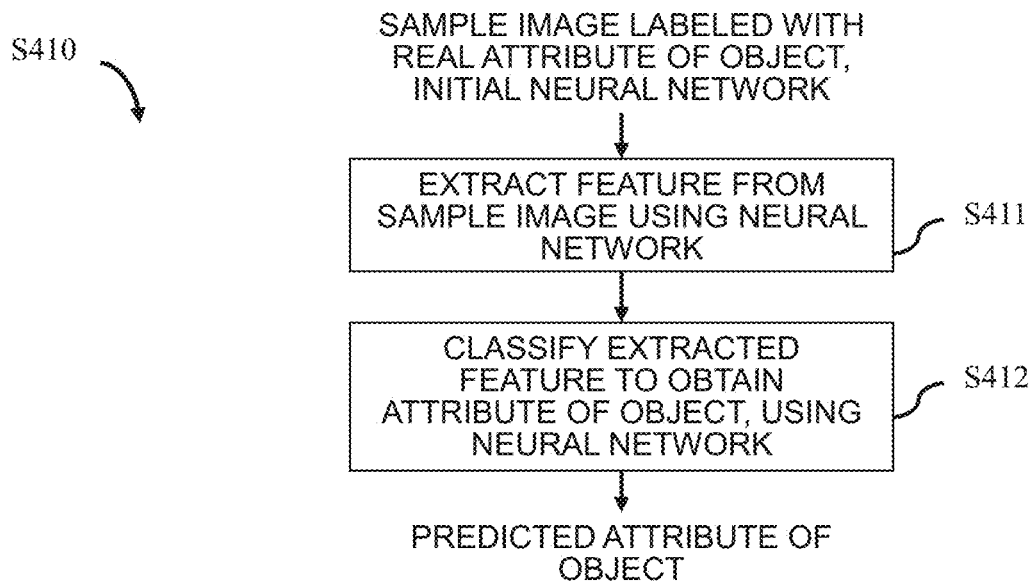
FIG. 5 schematically illustrates a flowchart of the recognizing step S410 shown in FIG. 4 according to one or more aspects of the present disclosure.

As shown in FIG. 5, in step S411, the recognizing unit 310 uses a neural network (for example, a sub-network for extracting a feature in the neural network) to extract a feature (for example, semantic feature) for recognizing an object attribute from the sample image.

In step S412, the recognizing unit 310 uses a neural network (for example, a sub-network for classification in the neural network) to classify the extracted features to obtain the attribute of the object (that is, the predicted attribute of the object). As described above, the attribute of the object is, for example, a person's age interval, more than one face attribute (e.g., age interval, gender, ethnicity, hair color, and the like) of a person or more than one human body attribute (e.g., gender, whether glasses are worn, shirt color, pants color, and the like) of a person. As described above, the sample images may be a plurality of single sample images or a plurality of paired sample images. In a case where the sample images are composed of a plurality of single sample images, the recognizing unit 310 recognizes, for example, only the attributes of the object. In a case where the sample images are composed of a plurality of paired sample images, for any pair of sample images, the recognizing unit 310 further recognizes the similarity between the obtained predicted attributes of the object in addition to the attributes of the object. Hereinafter, it will be described in detail with reference to FIGS. 9 to 13.

Returning to FIG. 4, in the determining step S420, the determining unit 320 determines the loss function value at least according to the margin value determined based on the semantic relationship between the attributes (that is, the semantic-based margin value), wherein the semantic relationship is obtained from a predefined table at least according to the real attribute of the object labeled in the sample image and the predicted attribute of the object obtained in the recognizing step S410. As described above, the predefined table is composed of the attributes and the semantic relationship between the attributes. In one implementation, the determining unit 320 performs a corresponding determining operation with reference to FIG. 6.

Figure 6:
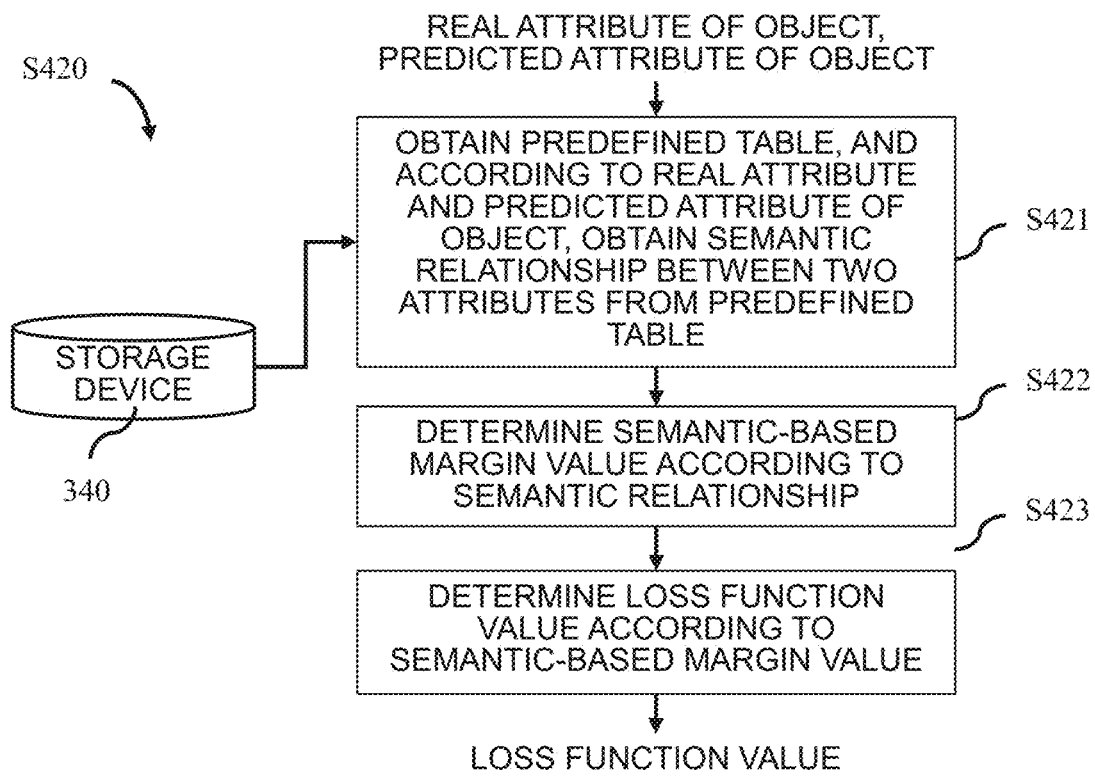
FIG. 6 schematically illustrates a flowchart of the determining step S420 shown in FIG. 4 according to one or more aspects of the present disclosure.

As shown in FIG. 6, in step S421, the determining unit 320 obtains a predefined table from the storage device 340, and at least according to the real attribute of the object labeled in the sample image and the predicted attribute of the object obtained in the recognizing step S410, obtain the semantic relationship between the real attribute and the predicted attribute from the predefined table, for example, by looking up a table.

As mentioned above, the sample images can be a plurality of single sample images or a plurality of paired sample images. Thus, on the one hand, in a case where the sample images are composed of a plurality of single sample images, the attributes in the obtained predefined table are, for example, the real attributes of the object and the predicted attributes of the object, and the semantic relationship between the attributes in the obtained predefined table is the semantic relationship between the real attributes of the object and the predicted attributes of the object. As an example, for example, the X-axis direction of the predefined table is used to represent the real attributes of the object, and the Y-axis direction of the predefined table is used to represent the predicted attributes of the object. And, in step S421, for any single sample image, the determining unit 320 searches and obtains the semantic relationship between the real attribute and the predicted attribute from the obtained predefined table, according to the real attribute of the object and the predicted attribute of the object.

On the other hand, in order to enhance the convergence of the generated neural network, the sample images can also be composed of a plurality of paired sample images. In a case where the sample images are composed of a plurality of paired sample images, the attributes in the obtained predefined table are, for example, the real attributes of the objects in the paired sample images. As an example, for example, the X-axis direction of the predefined table is used to represent a real attribute of an object in one sample image in the paired sample images, and the Y-axis direction of the predefined table is used to represent a real attribute of an object in another sample image in the paired sample images. And, in step S421, for any one pair of sample images, the determining unit 320 searches and obtains the semantic relationship between these two real attributes from the obtained predefined table, according to the real attributes of the objects in these two sample images.

Returning to FIG. 6, in step S422, the determining unit 320 determines a semantic-based margin value according to the semantic relationship between the attributes obtained in step S421. And in step S423, the determining unit 320 determines a loss function value at least according to the semantic-based margin value determined in step S422. As described above, the sample images may be a plurality of single sample images or a plurality of paired sample images. Thus, in a case where the sample images are composed of a plurality of single sample images, the determining unit 320 determines the loss function value according to the semantic-based margin value determined in step S422. In a case where the sample images are composed of a plurality of paired sample images, as described in the recognizing step S410, the recognizing unit 310 may further recognize the similarity between the predicted attributes of the object. Therefore, the determining unit 320 determines the loss function value according to the similarity recognized in the recognizing step S410 and the semantic-based margin value determined in step S422. Hereinafter, it will be described in detail with reference to FIGS. 9 to 13.

Returning to FIG. 4, in the updating step S430, the updating unit 330 updates parameters in the neural network according to the loss function value determined in the determining step S420. In one implementation, the updating unit 330 performs a corresponding update operation with reference to FIG. 7.

Figure 7:
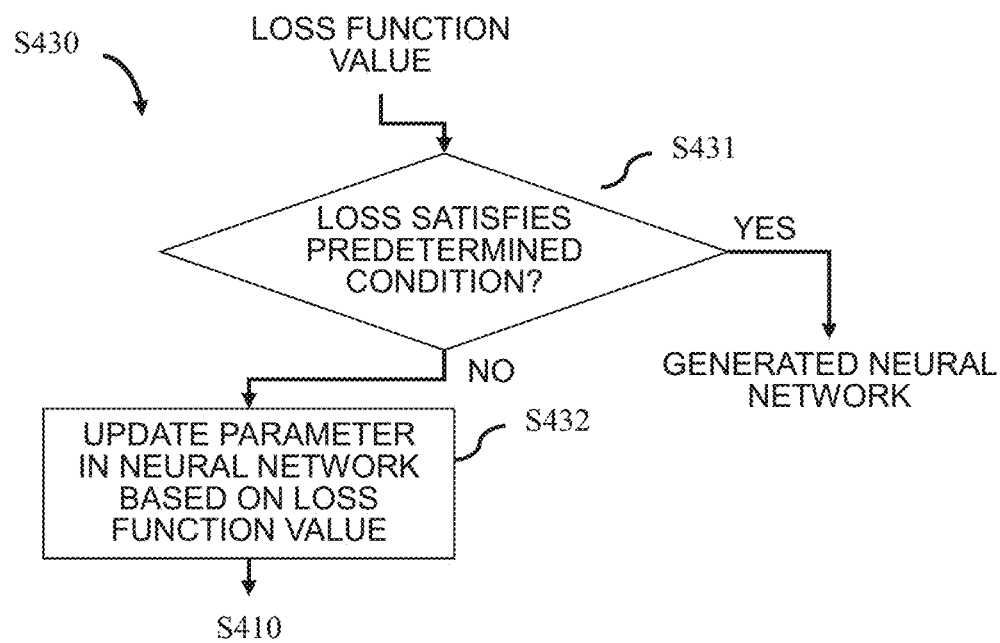
FIG. 7 schematically illustrates a flowchart of the updating step S430 shown in FIG. 4 according to one or more aspects of the present disclosure.
Figure 8:
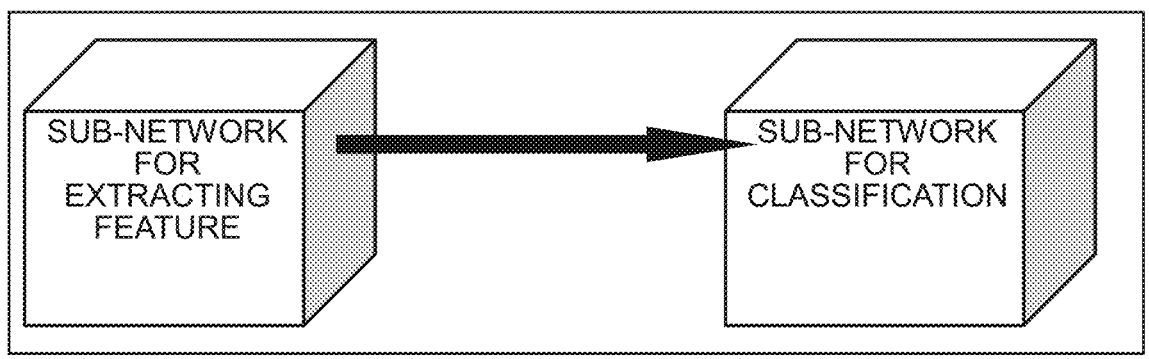
FIG. 8 schematically illustrates a schematic structure of a neural network generated according to one or more aspects of the present disclosure.

As shown in FIG. 7, in step S431, the updating unit 330 determines whether the neural network satisfies a predetermined condition based on the loss function value determined in the determining step S420. For example, the loss function value is compared with a threshold (for example, TH). In a case where the loss function value is less than or equal to TH, the neural network will be determined to satisfy the predetermined conditions and will be output as the finally generated neural network. Wherein the finally generated neural network is output to the storage device 340 shown in FIG. 3, for example. In addition, FIG. 8 schematically illustrates a schematic structure of a neural network generated according to an embodiment of the present disclosure. In a case where the loss function value is greater than TH, the neural network will be determined not to satisfy the predetermined condition yet, and the process proceeds to step S432.

In step S432, the updating unit 330 updates the parameters of each layer of the neural network based on the loss function value determined in the determining step S420. Wherein the parameters of each layer here are, for example, weight values in each convolutional layer in the neural network. In one example, the parameters of each layer are updated based on the loss function value, for example, using a stochastic gradient descent method. After that, the process proceeds to the recognizing step S410 again.

In the flow S430 shown in FIG. 7, whether the loss function value satisfies a predetermined condition is used as a condition to stop updating the neural network. However, it is obviously not necessary to be limited to this. As an alternative, for example, step S431 may be omitted, and the corresponding update operation is stopped after the times of updates to the neural network reaches a predetermined times.

(Generating a Neural Network for Recognizing a Person's Age Interval)

As mentioned above, the recognized attribute of the object may be a person's age interval. A flowchart 900 of a method for generating a neural network that can recognize a person's age interval according to the present disclosure will be described below with reference to FIG. 9. Wherein in the method flowchart, the sample images are composed of a plurality of single sample images. Wherein the apparatus for generating a neural network corresponding to the method flowchart 900 may be the same as the apparatus 300 shown in FIG. 3.

Figure 9:
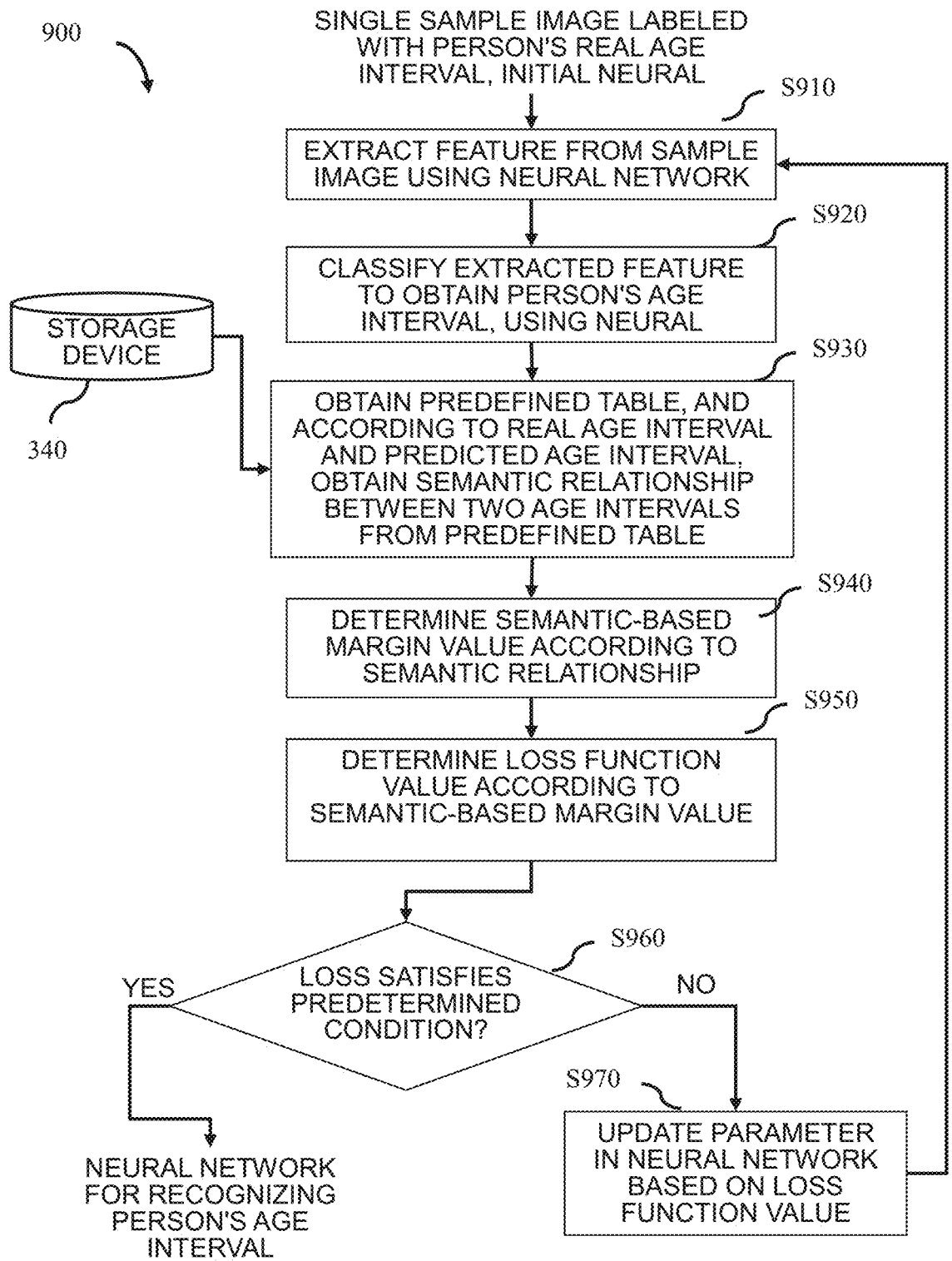
FIG. 9 schematically illustrates a flowchart of a method for generating a neural network that can recognize a person's age interval according to one or more aspects of the present disclosure.

As shown in FIG. 9, in step S910, the recognizing unit 310 shown in FIG. 3 uses, for example, a sub-network for extracting features in a neural network to extract semantic features for recognizing an age interval from a sample image.

In step S920, the recognizing unit 310 uses, for example, a sub-network for classification in the neural network to classify the extracted features to obtain a person's age interval (that is, a person's predicted age interval). In one implementation, for example, the recognizing unit 310 uses the sub-network for classification to obtain the confidence level of each age interval, and outputs the age interval with the maximum confidence level as the predicted age interval.

In step S930, the determining unit 320 shown in FIG. 3 obtains a predefined table from the storage device 340. Wherein the obtained predefined table is shown in FIG. 1A, for example. Wherein the X-axis direction of the predefined table represents, for example, the real age interval, the Y-axis direction of the predefined table represents, for example, the predicted age interval, and the order relationship (i.e., semantic relationship) between the age intervals is, for example, measured by the Euclidean distance. And, in step S930, the determining unit 320 obtains the semantic relationship between real age interval and the predicted age interval from the predefined table according to the person's real age interval labeled in the sample image and the person's predicted age interval obtained in step S920, for example, by looking up a table. For example, assuming that the person's real age interval labeled in the sample image is [20-29], and the person's predicted age interval obtained through the recognizing unit 310 is [70-79], it can be obtained that the semantic relationship between these two age intervals is 50 by looking up the predefined table. For example, assuming that the person's real age interval labeled in the sample image is [20-29], and the person's predicted age interval obtained through the recognizing unit 310 is [30-39], it can be obtained that the semantic relationship between these two age intervals is 10 by looking up the predefined table.

In step S940, the determining unit 320 determines a semantic-based margin value according to the semantic relationship between the real age interval and the predicted age interval obtained in step S930. In one implementation, assuming that the semantic-based margin value can be represented by m, it can be obtained, for example, by the following formula (1):

$$m = \text{obtained semantic relationship} * \text{coefficient} \quad (1)$$

Wherein the "coefficient" in the formula (1) can be obtained, for example, by the following formula (2):

$$\text{coefficient} = \text{constant}/\text{regular term} \quad (2)$$

Wherein the "constant" in the formula (2) is, for example, 1 and the "regular term" in the formula (2) is, for example, 10. However, it is obvious that the formula for obtaining the semantic-based margin value is not limited to this, and those skilled in the art can design the calculation formula according to an actual application, as long as the obtained margin value is determined based on the semantic relationship between the attributes. For example, assuming that the "constant" is 1 and the "regular term" is 10, for a case where a person's real age interval is [20-29] and a person's predicted age interval is [70-79], m obtained by formula (1) is 5; for a case where a person's real age interval is [20-29] and a person's predicted age interval is [30-39], m obtained by formula (1) is 1. As can be seen, it is more reasonable to obtain a dynamically changed margin value (that is, a semantic-based margin value) according to the semantic relationship between a person's real age interval and a person's predicted age interval than the exemplary technology of the fixed margin value mentioned in the Description of the Related Art.

In step S950, the determining unit 320 determines a loss function value according to the semantic-based margin value determined in step S940. In one implementation, for example, a Softmax loss function can be improved by a semantic-based margin value to determine the loss function value. For example, the loss function value can be obtained by the following formula (3):

$$\text{Loss} = -\sum_{i=1}^{N} \log\left(\frac{e^{\cos(\theta_{y_i}+m)}}{e^{\cos(\theta_{y_i}+m)} + \sum_{j\neq y_i}^{M} e^{\cos(\theta_j)}}\right) \quad (3)$$

Wherein in formula (3), i represents the i-th sample image, N represents the total number of sample images, j represents the j-th age interval, M represents the total number of age intervals, $y_i$ represents a person's real age interval in the i-th sample image, represents the cosine angle value between the feature extracted from the i-th sample image and the weight vector representing the real age interval, and m represents the semantic-based margin value. However, it is obviously not limited to this, and other loss functions may also be improved by the semantic-based margin value to determine the loss function value according to an actual application.

In step S960, the updating unit 330 shown in FIG. 3 determines whether the neural network satisfies a predetermined condition based on the loss function value determined in step S950. In a case where the loss function value satisfies the predetermined condition, the neural network is determined to satisfy the predetermined condition and is output as a finally generated neural network, wherein the finally generated neural network is output to the storage device 340 shown in FIG. 3, for example. In a case where the loss function value does not satisfy the predetermined condition, the neural network will be determined not to satisfy the predetermined condition yet, and the process proceeds to step S970.

In step S970, the updating unit 330 updates the parameters of each layer of the neural network based on the loss function value determined in step S950. After that, the process proceeds to step S910 again.

As another implementation of the recognized attribute of the object being the person's age interval, as described above, in order to enhance the convergence of the generated neural network, a flowchart 1000 of another method for generating a neural network that can recognize a person's age interval according to the present disclosure will be described below with reference to FIG. 10. Wherein in the method flowchart, the sample images are composed of a plurality of paired sample images. Wherein the apparatus for generating a neural network corresponding to the method flowchart 1000 may be the same as the apparatus 300 shown in FIG. 3.

Figure 10:
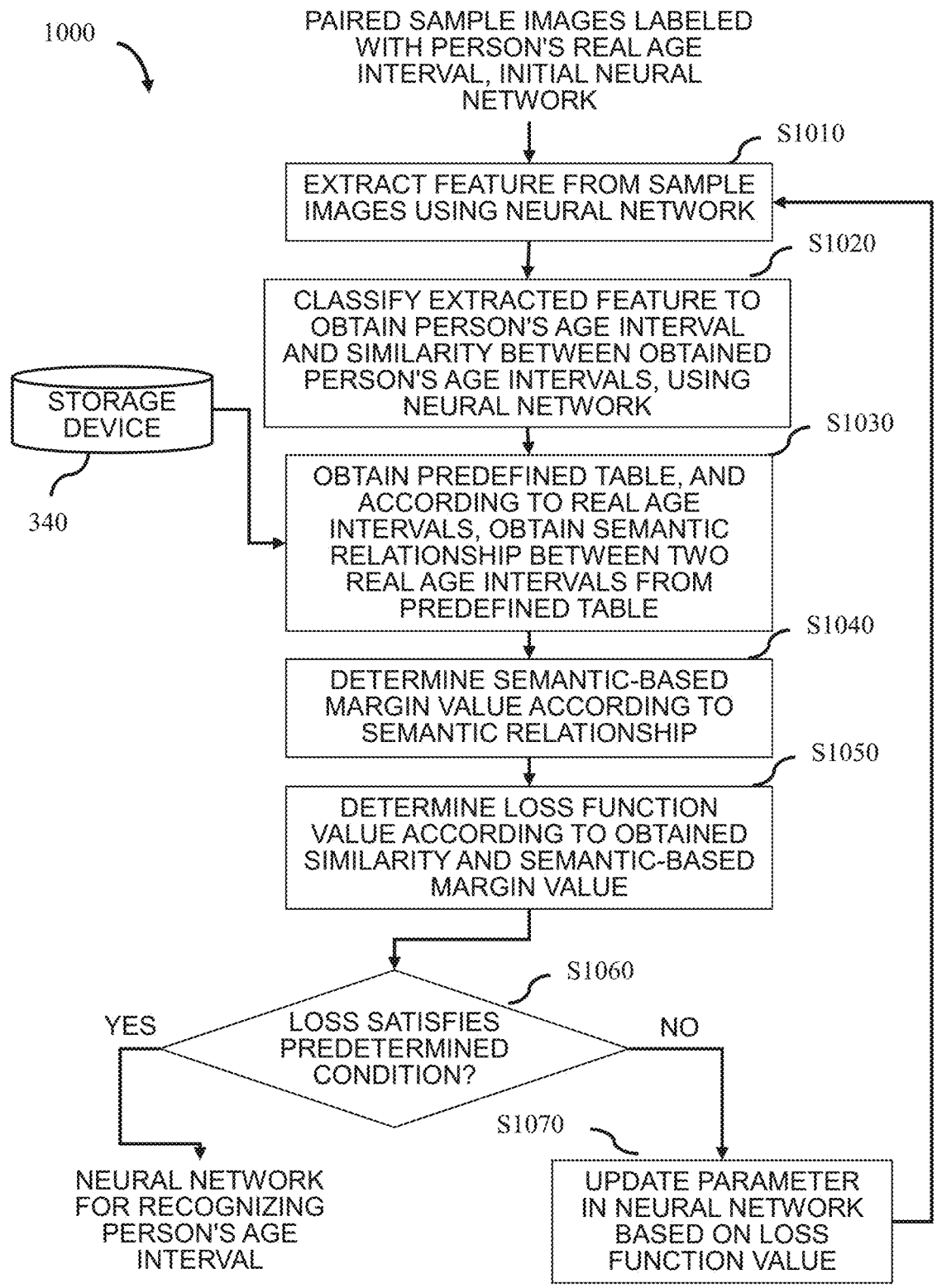
FIG. 10 schematically illustrates a flowchart of another method for generating a neural network that can recognize a person's age interval according to one or more aspects of the present disclosure.

As shown in FIG. 10, in step S1010, for any pair of sample images, the recognizing unit 310 shown in FIG. 3 uses, for example, a sub-network for extracting features in a neural network to extract corresponding features from two sample images respectively.

In step S1020, the recognizing unit 310 uses, for example, a sub-network for classification in the neural network to classify the extracted features to obtain person's age intervals (that is, person's predicted age intervals) in two sample images respectively. Since the corresponding operation is the same as that of step S920 shown in FIG. 9, details are not described herein again. Further, the recognizing unit 310, for example, also uses another sub-network for classification in the neural network to classify the person's predicted age intervals obtained from the two sample images to obtain the similarity between the two predicted age intervals.

In step 1030, the determining unit 320 shown in FIG. 3 obtains a predefined table from the storage device 340. Wherein the obtained predefined table is shown in FIG. 11, for example. Wherein the X-axis direction of the predefined table represents, for example, the person's real age interval in one sample image of paired sample images, the Y-axis direction of the predefined table represents, for example, the person's real age interval in another sample image of paired sample images, and the order relationship (i.e., semantic relationship) between the age intervals is, for example, measured by the Euclidean distance. And, in step S1030, the determining unit 320 obtains the semantic relationship between the two real age intervals from a predefined table according to the person's real age intervals labeled in the paired sample images, for example, by looking up a table. For example, assuming that the person's real age intervals labeled in the paired sample images are [20-29] and [70-79] respectively, it can be obtained that the semantic relationship between the two age intervals is 50 by looking up the predefined table. For example, assuming that the person's real age intervals labeled in the paired sample images are [0-9] and [20-29] respectively, it can be obtained that the semantic relationship between the two age intervals is 20 by looking up the predefined table.

In step S1040, the determining unit 320 determines a semantic-based margin value according to the order relationship between the real age intervals obtained in step S1030. Since the corresponding operation is the same as that of step S940 shown in FIG. 9, details are not described herein again.

In step S1050, the determining unit 320 regards the semantic-based margin value determined in step S1040 as the similarity between the person's real age intervals labeled in the paired sample images, and determines the loss function value according to the similarity between the real age intervals and the similarity between the two predicted age intervals obtained in step S1020. In one implementation, for example, the loss function value can be obtained by the following formula (4):

$$Loss = \sum_{j=1}^{N} P(X, Y) * m + (1 - P(X, Y)) * (1 - m) \quad (4)$$

Wherein in formula (4), i represents the i-th paired sample image, N represents the total number of paired sample images, P (X, Y) represents the similarity between two predicted age intervals, and m represents the similarity between two real age intervals (i.e., semantic-based margin value). However, it is obviously not limited to this, and according to an actual application, the loss function value may be determined based on the similarity between the real age intervals and the similarity between the predicted age intervals by other manners, as long as it can satisfy a condition that the more similar the real age interval and the predicted age interval are, the smaller the loss function value is.

In steps S1060 and S1070, the updating unit 330 shown in FIG. 3 updates the parameters in the neural network based on the loss function value determined in step S1050. Since the corresponding operations are the same as those of steps S960 and S970 shown in FIG. 9, details are not described herein again.

In addition, the neural network generated with reference to FIG. 9 or FIG. 10 can be directly used to recognize a person's age interval. For example, for an input image, a sub-network for extracting features in the generated neural network can be used first to extract features from the input image, and then a sub-network for classification in the generated neural network are used to recognize the person's age interval in the input image based on the extracted features.

(Generating a Neural Network for Recognizing More than One Face Attribute of a Person)

As mentioned above, the recognized attribute of the object may be more than one face attribute (for example, age interval, gender, ethnicity, hair color, and the like) of a person. In the following, a flowchart 1200 of a method for generating a neural network which can recognize more than one face attribute of a person according to the present disclosure will be described with reference to FIG. 12, by taking the recognized attribute of the object being person's [gender+be bearded or not] as an example. However, it is obviously not limited to this, and the recognized face attribute may be determined according to an actual application. In the method flowchart, the sample images are composed of a plurality of single sample images. Wherein the apparatus for generating a neural network corresponding to the method flowchart 1200 may be the same as the apparatus 300 shown in FIG. 3.

Figure 12:
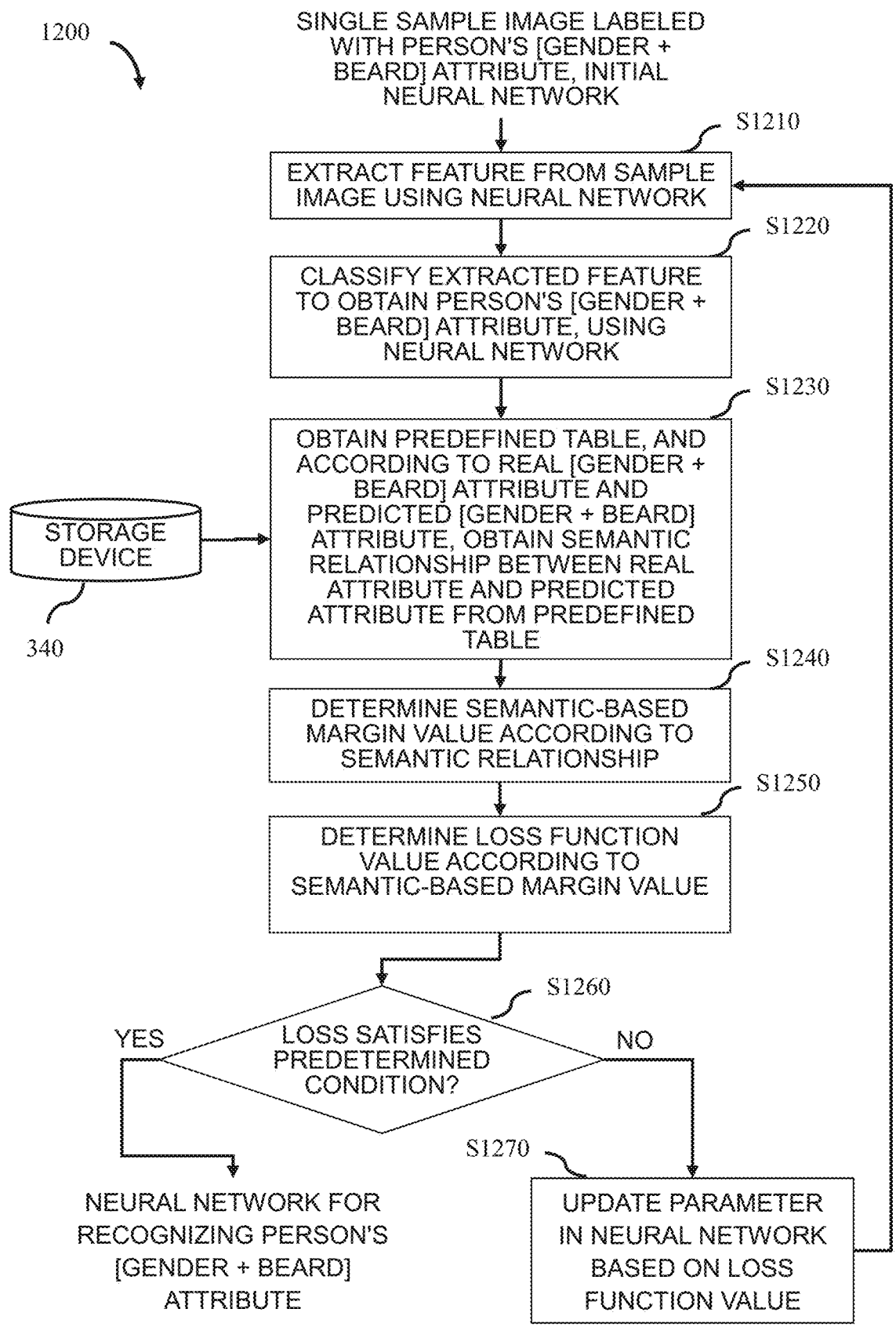
FIG. 12 schematically illustrates a flowchart of a method for generating a neural network that can recognize more than one face attribute of a person according to one or more aspects of the present disclosure.

As shown in FIG. 12, in step S1210, the recognizing unit 310 shown in FIG. 3 uses, for example, a sub-network for extracting features in a neural network to extract semantic features for recognizing person's gender attribute and beard attribute from sample images.

In step S1220, the recognizing unit 310 uses, for example, a sub-network for classification in the neural network to classify the extracted features to obtain a person's [gender+beard] attribute (that is, a person's predicted [gender+beard] attribute). In one implementation, for example, the recognizing unit 310 uses the sub-network for classification to obtain the confidence level of each face attribute, and outputs each face attribute having the maximum confidence level as a person's predicted attribute.

In step S1230, the determining unit 320 shown in FIG. 3 obtains a predefined table from the storage device 340, and according to the person's real [gender+beard] attribute labeled in the sample image and the person's predicted [gender+beard] attribute obtained in step S1220, for example, by looking up a table, obtain a similarity relationship (i.e., a semantic relationship) between the real [gender+beard] attribute and the predicted [gender+beard] attribute from the predefined table.

Since the similarity relationship between attributes can be measured by a Hamming distance or a correlation coefficient, in one implementation, in a case where the similarity relationship is measured by the Hamming distance, the obtained predefined table is shown in FIG. 1B for example. Wherein the X-axis direction of the predefined table represents, for example, the real [gender+beard] attribute, the Y-axis direction of the predefined table represents, for example, the predicted [gender+beard] attribute, and the similarity relationship (i.e., semantic relationship) between the real attribute and the predicted attribute is measured, for example, by the Hamming distance. Wherein the Hamming distance represents the number of different attributes included in the real attribute and the predicted attribute. From this, it can be known that the smaller the Hamming distance between the predicted attribute and the real attribute is, the closer the predicted attribute to be the real attribute is, and the smaller the semantic-based margin between the predicted attribute and the real attribute is. For example, assuming that the person's real [gender+beard] attribute labeled in the sample image is [female+beardless], and the person's predicted [gender+beard] attribute obtained by the recognizing unit 310 is [female+bearded], it can be obtained that the semantic relationship between these two attributes is 1 by looking up the predefined table. For example, assuming that the person's real [gender+beard] attribute labeled in the sample image is [female+beardless], and the person's predicted [gender+beard] attribute obtained by the recognizing unit 310 is [male+bearded], it can be obtained that the semantic relationship between these two attributes is 2 by looking up the predefined table.

In another implementation, in a case where the similarity relationship between attributes is measured by a correlation coefficient, the obtained predefined table is shown in FIG. 13A, for example. Wherein the X-axis direction of the predefined table represents, for example, the real [gender+beard] attribute, the Y-axis direction of the predefined table represents, for example, the predicted [gender+beard] attribute, and the similarity relationship between the real attribute and the predicted attribute is measured, for example, by a correlation coefficient. Wherein the greater the correlation between the predicted attribute and the real attribute is, the closer the predicted attribute to be the real attribute is, and the smaller the semantic-based margin between the predicted attribute and the real attribute is. Wherein the correlation coefficient can be obtained from a correlation matrix composed of attributes, and wherein the correlation matrix can be obtained from a sample image that conforms to the actual situation in a statistical manner, for example. For example, taking the [gender+beard] attribute as an example, the correlation matrix obtained in a statistical manner is shown in FIG. 13B, wherein the numbers in the figure represent correlation coefficients. As shown in FIG. 13B, in the actual situation, the probability that a female is bearded is very small, so that the correlation coefficient "−0.9" can indicate that the [female+bearded] attribute belongs to negative correlation and the probability of actually occurring is very low. In the present disclosure, a similarity relationship (i.e., a semantic relationship) between a real attribute and a predicted attribute can be obtained, for example, by the following formula (5):

similarity relationship=|1−correlation coefficient of real attribute*correlation coefficient of predicted attribute| (5)

However, it is obviously not limited to this, as long as the function between the similarity relationship and the correlation coefficient can reasonably constrain the loss function value. For example, assuming that the person's real [gender+beard] attribute labeled in the sample image is [female+beardless], and the person's predicted [gender+beard] attribute obtained by the recognizing unit 310 is [female+bearded], it can be obtained that the similarity relationship between the two attributes is 9.5 by looking up the predefined table. For example, assuming that the person's real [gender+beard] attribute labeled in the sample image is [female+beardless], and the person's predicted [gender+beard] attribute obtained by the recognizing unit 310 is [female+beardless], it can be obtained that the similarity relationship between the two attributes is 0 by looking up the predefined table.

Returning to FIG. 12, after obtaining the semantic relationship between the real [gender+beard] attribute and the predicted [gender+beard] attribute via step S1230, in step S1240, the determining unit 320 determines the semantic-based margin value according to the semantic relationship between the real [gender+beard] attribute and the predicted [gender+beard] attribute obtained in step S1230. Since the corresponding operations of steps S1240 to S1270 shown in FIG. 12 are the same as the corresponding operations of steps S940 to S970 shown in FIG. 9, details are not described herein again.

In addition, as an application of the present disclosure, referring to a corresponding operation for generating a neural network which can recognize more than one face attribute of a person, the present disclosure can also be used to generate a neural network for re-recognizing a pedestrian identity. A flowchart 1400 of a method for generating a neural network capable of re-recognizing a pedestrian identity according to the present disclosure will be described below with reference to FIG. 14. Wherein in the method flowchart, the sample images are composed of a plurality of single sample images, and more than one human body attribute of a person and person's identity information are labeled in the sample image. Wherein the labeled human body attributes may be, for example, gender, whether glasses are worn, shirt color, pants color, and the like, but it is obviously not limited to this. Wherein the apparatus for generating a neural network corresponding to the method flowchart 1400 may also be the same as the apparatus 300 shown in FIG. 3.

Figure 14:
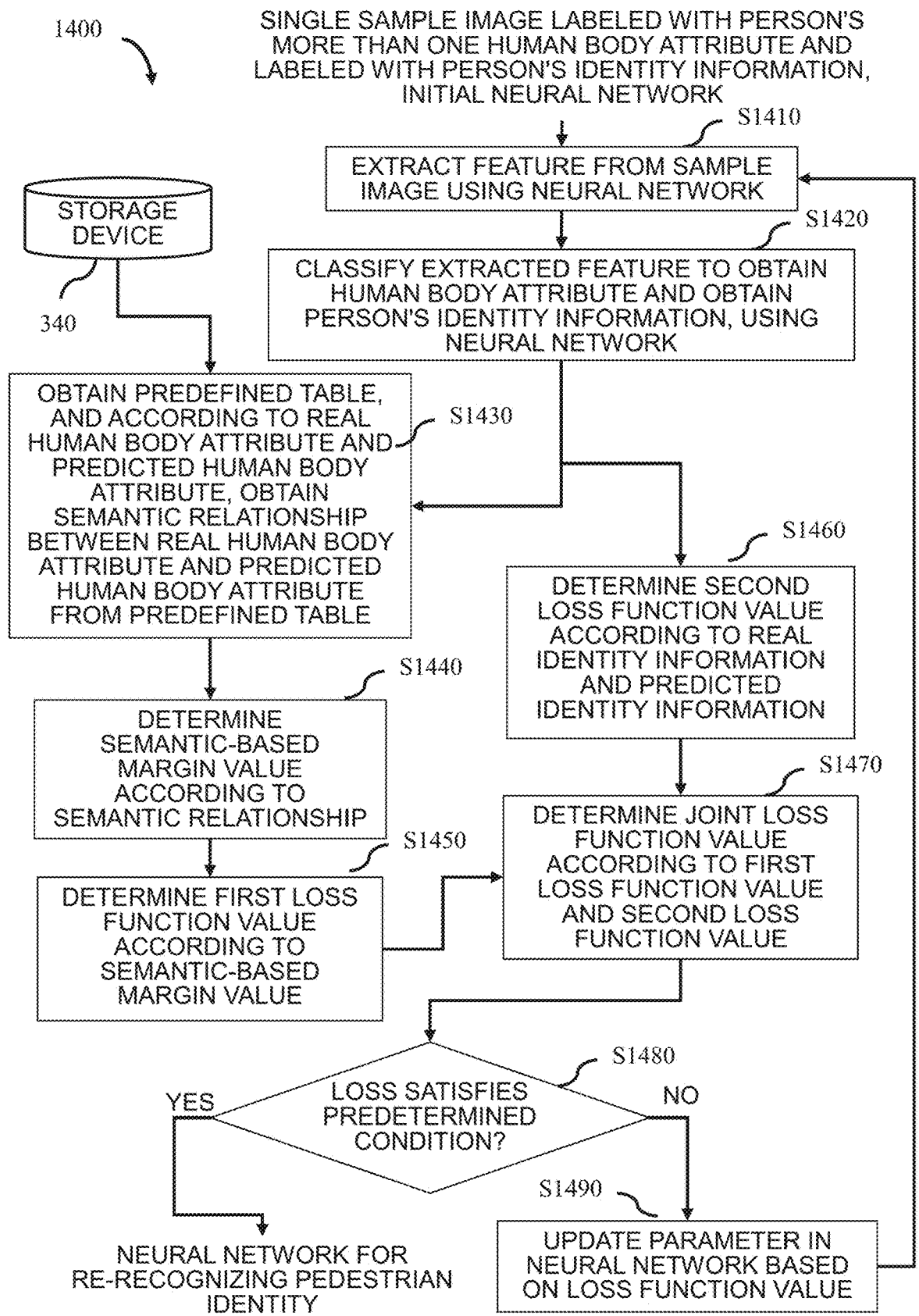
FIG. 14 schematically illustrates a flowchart of a method for generating a neural network that can re-recognize a pedestrian identity according to one or more aspects of the present disclosure.

As shown in FIG. 14, in step S1410, the recognizing unit 310 shown in FIG. 3 uses, for example, a sub-network for extracting features in a neural network to extract semantic features for recognizing person's human body attributes and features for recognizing person's identity information from a sample image.

In step S1420, the recognizing unit 310 uses, for example, a sub-network for classification in the neural network to classify the extracted semantic features for recognizing person's human body attributes to obtain the person's human body attributes (i.e., person's predicted human body attributes). Since the corresponding operation is the same as that of step S1220 shown in FIG. 12, details are not described herein again. Further, for example, the recognizing unit 310 also uses another sub-network for classification in the neural network to classify the extracted features for recognizing the person's identity information to obtain the person's identity information (i.e., person's predicted identity information).

In step S1430, the determining unit 320 shown in FIG. 3 obtains a predefined table from the storage device 340, and according to the person's real human body attributes labeled in the sample image and the person's predicted human body attributes obtained in step S1420, obtains the similarity relationship (i.e., semantic relationship) between real human body attributes and predicted human body attributes from a predefined table, for example by looking up a table. Wherein the X-axis direction of the obtained predefined table represents, for example, a combination of real human body attributes, the Y-axis direction of the obtained predefined table represents, for example, a combination of predicted human body attributes, and the similarity relationship between the combination of real human body attributes and the combination of predicted human body attributes is measured by, for example, a Hamming distance. Wherein the combination of human body attributes is, for example, [gender+whether glasses are worn+shirt color], however it is obviously not limited to this. Since the corresponding operation is the same as that of step S1230 shown in FIG. 12, details are not described herein again.

In step S1440, the determining unit 320 determines a semantic-based margin value according to the semantic relationship between the real human body attribute and the predicted human body attribute obtained in step S1430. In step S1450, the determining unit 320 determines a first loss function value according to the semantic-based margin value determined in step S1440. Since the corresponding operations are the same as those of steps S1240 and S1250 shown in FIG. 12, details are not described herein again.

In step S1460, the determining unit 320 determines a second loss function value according to the person's real identity information labeled in the sample image and the person's predicted identity information obtained in step S1420, for example, using an existing Softmax loss function, and the like.

In step S1470, the determining unit 320 determines a joint loss function value according to the first loss function value determined in step S1450 and the second loss function value determined in step S1460, for example, by means of summation or weighted summation.

In steps S1480 and S1490, the updating unit 330 shown in FIG. 3 updates the parameters in the neural network based on the joint loss function value determined in step S1470. Since the corresponding operations are the same as those of steps S1260 and S1270 shown in FIG. 12, details are not described herein again.

In addition, the neural network generated with reference to FIG. 14 can be directly used to re-recognize a pedestrian identity. For example, for an input image, first, the sub-network for extracting features in the generated neural network can be used to extract from the input image the semantic features used to recognize the person's human body attributes and the features used to recognize the person's identity information; then, the sub-network for classification in the generated neural network is used to recognize the person's human body attributes in the input image based on the extracted semantic features for recognizing the person's human body attributes; and last, another sub-network for classification in the generated neural network is used to recognize the person's identity information in the input image, based on the extracted features for recognizing the person's identity information and the recognized human body attributes. Since when a neural network for re-recognizing a pedestrian identity is generated, a semantic relationship between human body attributes is introduced as supervising information for identity recognition, the accuracy of re-recognizing a pedestrian identity can be improved by using the neural network generated according to the present disclosure.

All of the above units are exemplary and/or preferred modules for implementing the processing described in this disclosure. These units may be hardware units (such as a field programmable gate array (FPGA), a digital signal processor, an application specific integrated circuit, and the like) and/or software modules (such as a computer-readable program). The units for implementing steps are not described in detail above. However, when there are steps to perform a specific process, there may be corresponding functional modules or units (implemented by hardware and/or software) for implementing the same process. The technical solutions of all combinations of the described steps and units corresponding to these steps are included in the disclosure of the present application, as long as the technical solutions constructed by them are complete and applicable.

The method and apparatus of the present disclosure can be implemented in a variety of manners. For example, the method and apparatus of the present disclosure may be implemented by software, hardware, firmware, or any combination thereof. Unless specifically stated otherwise, the above order of steps of the method is only intended to be illustrative, and the steps of the method of the present disclosure are not limited to the order specifically described above. Furthermore, in some embodiments, the present disclosure may also be implemented as a program recorded in a recording medium, which includes machine-readable instructions for implementing the method according to the present disclosure. Therefore, the present disclosure also covers a recording medium storing a program for implementing the method according to the present disclosure.

While the present disclosure has been described with reference to exemplary embodiments, the scope of the following claims are to be accorded the broadest interpretation so as to encompass all such modifications and equivalent structures and functions.

This application claims the benefit of Chinese Patent Application No. 201910841072.1, filed Sep. 6, 2019, which is hereby incorporated by reference herein in its entirety.

What is claimed is:

1. A method for generating a neural network for recognizing an attribute of an object, comprising:
recognizing a person's age interval as an attribute of an object in a sample image according to a feature extracted from the sample image, using the neural network;
determining a loss function value at least according to a margin value determined based on a semantic relationship between attributes, wherein the semantic relationship is obtained from a predefined table at least according to a real attribute and the recognized attribute of the object, and wherein the semantic relationship between the attributes in the predefined table is measured by a Euclidean distance between the attributes each being the person's age interval; and
updating a parameter in the neural network according to the determined loss function value,
wherein in the recognizing, for any pair of sample images, a similarity between the recognized attributes in these two sample images is further recognized; and
wherein in the determining, the loss function value is determined based on the determined margin value and the recognized similarity.

2. The method according to claim 1, wherein the semantic relationship between the attributes in the predefined table represents an order relationship between the attributes or a similarity relationship between the attributes.

3. The method according to claim 2, wherein the semantic relationship between the attributes in the predefined table is measured by a Euclidean distance between the attributes, a Hamming distance between the attributes, or a correlation coefficient between the attributes.

4. The method according to claim 2, wherein in a case where the sample image is composed of a plurality of single sample images, the attributes in the predefined table are a real attribute and a predicted attribute, and the semantic relationship between the attributes in the predefined table is a semantic relationship between the real attribute and the predicted attribute; and in the determining, for any single sample image, a semantic relationship for determining the margin value is obtained from the predefined table, according to the real attribute and the recognized attribute of the object in the sample image.

5. The method according to claim 4, wherein in the recognizing, the recognized attribute is a person's age interval.

6. The method according to claim 5, wherein the attributes in the predefined table are age intervals arranged in order, and the semantic relationship between the attributes in the predefined table is measured by a Euclidean distance between the age intervals.

7. The method according to claim 4, wherein in the recognizing, the recognized attribute is more than one face attribute of a person.

8. The method according to claim 7, wherein the attributes in the predefined table are combinations of face attributes, and the semantic relationship between the attributes in the predefined table is measured by a Hamming distance or a correlation coefficient between the combinations of face attributes.

9. The method according to claim 8, wherein the correlation coefficient is obtained from a correlation matrix composed of face attributes.

10. The method according to claim 4, wherein in the recognizing, the recognized attribute is more than one human body attribute of a person;
wherein in the recognizing, a person's identity information in the sample image is further recognized;
wherein in the determining, another loss function value is further determined based on a person's real identity information and the recognized identity information in the sample image, and a joint loss function value is determined based on the determined two loss function values; and
wherein in the updating, the parameter in the neural network is updated according to the determined joint loss function value.

11. The method according to claim 2, wherein in a case where the sample image is composed of a plurality of paired sample images, the attributes in the predefined table are real attributes; and
in the determining, for any pair of sample images, a semantic relationship for determining the margin value can also be obtained from the predefined table, according to real attributes of objects in these two sample images.

12. An apparatus for generating a neural network for recognizing an attribute of an object, comprising:
a recognizing unit configured to recognize a person's age interval as an attribute of an object in a sample image according to a feature extracted from the sample image, using the neural network;
a determining unit configured to determine a loss function value at least according to a margin value determined based on a semantic relationship between attributes, wherein the semantic relationship is obtained from a predefined table at least according to a real attribute and the recognized attribute of the object, wherein the semantic relationship between the attributes in the predefined table is measured by a Euclidean distance between the attributes each being the person's age interval; and
an updating unit configured to update a parameter in the neural network according to the determined loss function value,
wherein in the recognizing, for any pair of sample images, a similarity between the recognized attributes in these two sample images is further recognized; and
wherein in the determining, the loss function value is determined based on the determined margin value and the recognized similarity.

13. A system for generating a neural network for recognizing an attribute of an object, comprising:
one or more memories having stored thereon data and instructions; and
one or more processors connected to the one or more memories and used to execute the instructions, the instructions comprising:
recognizing a person's age interval as an attribute of an object in a sample image according to a feature extracted from the sample image, using the neural network;
determining a loss function value at least according to a margin value determined based on a semantic relationship between attributes, wherein the semantic relationship is obtained from a predefined table at least according to a real attribute and the recognized attribute of the object, wherein the semantic relationship between the attributes in the predefined table is measured by a Euclidean distance between the attributes each being the person's age interval; and
updating a parameter in the neural network according to the determined loss function value,
wherein in the recognizing, for any pair of sample images, a similarity between the recognized attributes in these two sample images is further recognized; and
wherein in the determining, the loss function value is determined based on the determined margin value and the recognized similarity.

14. A non-transitory computer readable storage medium storing instructions, which, when executed by one or more processors, enable to execute a method for generating a neural network for recognizing an attribute of an object, the instructions comprising:
recognizing a person's age interval as an attribute of an object in a sample image according to a feature extracted from the sample image, using the neural network;
determining a loss function value at least according to a margin value determined based on a semantic relationship between attributes, wherein the semantic relationship is obtained from a predefined table at least according to a real attribute and the recognized attribute of the object, and
wherein the semantic relationship between the attributes in the predefined table is measured by a Euclidean distance between the attributes each being the person's age interval; and
updating a parameter in the neural network according to the determined loss function value,
wherein in the recognizing, for any pair of sample images, a similarity between the recognized attributes in these two sample images is further recognized; and
wherein in the determining, the loss function value is determined based on the determined margin value and the recognized similarity.

\* \* \* \* \*